Patented Dec. 28, 1943

2,337,576

UNITED STATES PATENT OFFICE 2,337,576

BENZYLTHIOURONIUM SALT OF PANTOTHENIC ACID AND PROCESS OF MAKING THE SAME

Eric Thomas Stiller, New York, N. Y., assignor to Merck & Co., Inc., Rahway, N. J., a corporation of New Jersey No Drawing. Application July 3, 1940, Serial No. 343,781

2 Claims. (Cl. 260—534)

This invention relates to pantothenic acid, derivatives thereof, and processes of preparing the same.

According to the present invention an α-hydroxy-β,β-dimethyl-γ-butyrolactone is reacted with a β-alanine ester to form pantothenic acid. If (—) α-hydroxy-β,β-dimethyl-γ-butyrolactone is employed as the starting material, (+) pantothenic acid is obtained. If (+) α-hydroxy-β,β-dimethyl-γ-butyrolactone is employed as the starting material, (—) pantothenic acid is obtained.

(+) and (—), when used in the specification and claims, indicate the optical rotation of the compounds. These symbols are used in preference to the designations d- and l-, which refer to the optical configuration of the compounds. In the present case, the actual configuration is not known. For convenience, the (+) compounds are designated as being dextro-rotatory and the (—) compounds as being laevorotatory in the claims.

The (+) and (—) lactones may be obtained by forming an alkaloidal salt of racemic α,γ-dihydroxy-β,β-dimethyl-γ-butyric acid, separating the optically isomeric salts by fractional crystallization, and converting the separated salts into (+) and (—) lactones.

The pantothenic acids may be conveniently converted into their salts.

Example I 986.0 mg. (—) α-hydroxy-β,β-dimethyl-γ-butyrolactone are mixed with 2.2 gm. of freshly distilled β-analine ethyl ester, and the mixture heated at 70° C. for 2½ hours. After cooling, the mixture is dissolved in 80 cc. of 0.45 N Ba(OH)₂, and allowed to remain at room temperature for 2½ hours. The barium is removed quantitatively with 6 N sulfuric acid, and the barium sulfate is washed twice with water. The combined aqueous solution and washings are neutralized to pH 5–6 with pyridine, and evaporated to dryness in vacuo at 25° C. The product is dissolved in 5 cc. of methanol, and 300 cc. of acetone are slowly added with vigorous stirring. After standing at 0° C. for some time, the clear supernatent liquor is decanted, and the precipitated material retreated with alcohol and acetone. The combined alcohol-acetone liquors are evaporated to dryness in vacuo at 25° C. The viscous oil is then dissolved in 10 cc. of water, and neutralized with aqueous barium hydroxide solution, or by means of barium carbonate, or calcium carbonate. The solution is continuously extracted with ether for 18 hours. The alkaline earth metal ion is then quantitatively removed by means of 6 N H₂SO₄, and the solution evaporated to dryness under reduced pressure at 25° C., after adjusting the pH to 5–6 by means of pyridine. The residue, thoroughly dried in high vacuo, is then extracted with reagent acetone, and separated from a little insoluble material. The acetone is removed, leaving a viscous oil. Yield of (+) pantothenic acid is 603 mg.

Example II

A solution of 600 mg. of (+) pantothenic acid in 5 cc. of water is neutralized with calcium carbonate. After removal of the excess calcium carbonate by filtration, the solution is evaporated to dryness at 25° C. in vacuo. The resulting hard, colorless mass on treatment with acetone gives a colorless, micro-crystalline powder. Yield of the calcium salt of pantothenic acid is 620 mg. It is purified by dissolving in the minimum amount of methanol, and filtering from a trace of insoluble material. The methanol solution is then added slowly to a large volume of acetone with vigorous stirring. The colorless microcrystalline powder is filtered off and dried at 78° in vacuum. $[\alpha]^{25}_D = +24.27°$ (C=1.566% in H₂O). The calcium salt may be crystallised from isopropanol as clusters of radiating colorless needles.

Example III

A solution of 0.45 gm. of (+) pantothenic acid in 3 cc. of methyl alcohol is neutralized to pH 7.5 with N sodium methoxide. A solution of 0.45 gm. of benzylthiuronium chloride in 2 cc. of methanol is added, and the mixture allowed to stand for some time. The methanol is removed by distillation, the residue extracted several times with warm acetone, and the extract filtered in order to remove sodium chloride. The acetone solution is then concentrated and the benzylthiuronium salt crystallizes out as colorless needles. m. p. 151–152.

Example IV 2.88 gm. of (+)-α-hydroxy-β,β-dimethyl-γ-butyrolactone and 5.76 gm. of freshly distilled β-alanine ethyl ester are heated at 70° C. for 3 hours. The resulting mixture is treated with 200 cc. of 0.45 N barium hydroxide at room temperature for 2½ hours. The barium ion is then removed quantitatively by means of 6 N sulfuric acid. The barium sulfate is removed by centrifuging and washing twice with a small amount of water. The solution is adjusted to pH 5–6 with pyridine, and evaporated to dryness in vacuo at 25° C. The resulting almost colorless syrup is then dried in high vacuo over sulfuric acid, after which it is dissolved in methyl alcohol, and diluted with a large volume of acetone, with vigorous stirring. The mixture is kept at 0° C. until the oil separates and partially crystallizes, and the supernatent liquid is clear. The acetone insoluble material is twice reworked with methanol and acetone. The combined acetone-methanol liquors are evaporated to dryness in vacuo at 25° C. The resulting pale yellow viscous oil is dissolved in 30 cc. of water, neutralized to pH 7.5 with 0.9 N barium hydroxide, and continuously extracted with ether for 18 hours. By this means a small amount of unchanged lactone is removed. The barium ion is quantitatively removed with 6 N sulfuric acid, and the resulting barium sulfate is twice washed with water. The combined aqueous liquors are adjusted to pH 5–6 by means of pyridine, and evaporated to dryness at 25° C. in vacuo. The resulting pale yellow oil is dried in high vacuo at 40° C., and extracted twice with 100 cc. portions of reagent acetone with vigorous shaking.

The extracts are allowed to stand at 0° C. until the supernatent liquid has cleared. It is then filtered to remove a small amount of crystalline $\beta$-alanine. The acetone is removed in vacuo at 40° C., leaving an almost colorless viscous oil. Yield of (−) pantothenic acid is 3.8 gm.

Example V

Upon treating 3.5 gm. of (−) pantothenic acid with calcium carbonate according to the process of Example II, a colorless, micro-crystalline powder is obtained. The yield of the calcium salt of (−) pantothenic acid is 3.33 gm. $(\alpha)^{25}_D = -23.8°$.

Example VI

A solution of 0.443 gram of (−) pantothenic acid in 2 cc. of methyl alcohol is cooled, and neutralized to pH 7.5 with a solution of sodium methylate. 0.443 gram of benzylthiuronium chloride in 2 cc. of methanol are added and the mixture allowed to stand over night. The methanol is then evaporated off, the residue extracted with hot acetone, filtered, and the acetone extract concentrated until the salt commences to crystallize. The benzylthiuronium salt crystallizes as colorless tiny needles and is purified by recrystallization from acetone, melting point 151° C.

The foregoing examples are given by way of illustration and not of limitation, and modifications may be made without departing from the spirit and scope of the invention.

I claim:

1. The benzylthiuronium salt of (+) pantothenic acid.

2. Process that comprises reacting an alkali metal salt of dextrorotatory pantothenic acid with benzyl thiuronium chloride to produce the corresponding benzyl thiuronium salt.

ERIC T. STILLER.

CERTIFICATE OF CORRECTION.

Patent No. 2,337,576. December 28, 1943.

ERIC THOMAS STILLER.

It is hereby certified that error appears in the printed specification of the above numbered patent requiring correction as follows: Page 2, second column, line 27, claim 1, for "salt of (+)" read --salt of dextrorotatory--; and that the said Letters Patent should be read with this correction therein that the same may conform to the record of the case in the Patent Office.

Signed and sealed this 29th day of February, A. D. 1944.

Leslie Frazer (Seal) Acting Commissioner of Patents.